C. F. KAY.
SIGNALING DEVICE.
APPLICATION FILED JULY 7, 1916.

1,308,498.

Patented July 1, 1919.

Witnesses

Inventor
C. F. Kay
By
Attorney

UNITED STATES PATENT OFFICE.

CHARLES F. KAY, OF SPOKANE, WASHINGTON.

SIGNALING DEVICE.

1,308,498.  Specification of Letters Patent.  Patented July 1, 1919.

Application filed July 7, 1916. Serial No. 107,964.

*To all whom it may concern:*

Be it known that I, CHARLES F. KAY, a citizen of the United States, residing at Spokane, in the county of Spokane, State of Washington, have invented certain new and useful Improvements in Signaling Devices; and I do hereby declare the following to be a full, clear, and exact description of the invention, such as will enable others skilled in the art to which it appertains to make and use the same.

This invention relates to the class of signaling devices, and has particular reference to a traffic indicating device for use on automobiles and other vehicles.

The invention has for its object to provide a traffic signal which may be operated to advise drivers of cars in the rear of the one carrying the signal of the intentions of the driver, relative to the direction of the vehicle, and at the same time to notify the traffic policeman and drivers of cars in front of the vehicle carrying the signal of the driver's intentions. To this end, my invention consists in providing a signaling apparatus which is normally held in a position where it is insignificant to the gaze of parties in front of or behind the vehicle, but which, when it is desired to transmit a signal, can be turned into full view and simultaneously illuminated to provide a bright object through whose medium the desired information may be conveyed.

A further object of the invention is to provide a signaling system of the type above indicated which includes an electrical circuit which may be controlled from the steering wheel of the vehicle, or otherwise, the signals being both turned and illuminated by electric power.

With the above and other objects in view, as will hereinafter appear, my invention will now be fully set forth and described, reference being had to the accompanying drawings.

In said drawings:—

Figure 1:
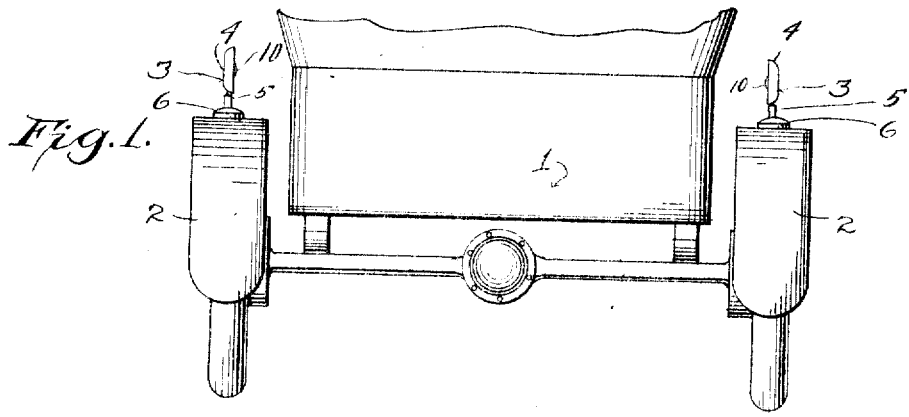
Figure 2:
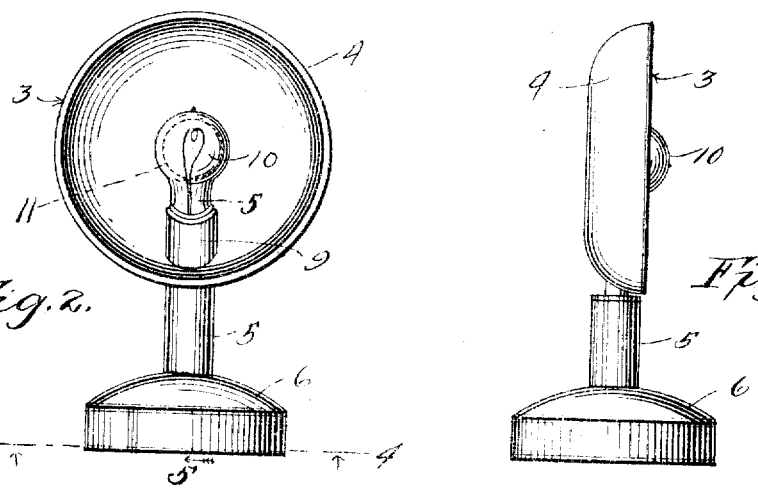
Figure 3:
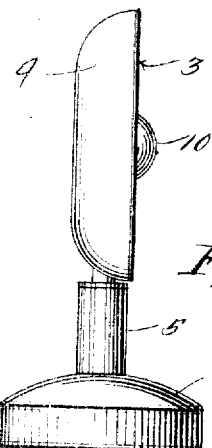
Figure 4:
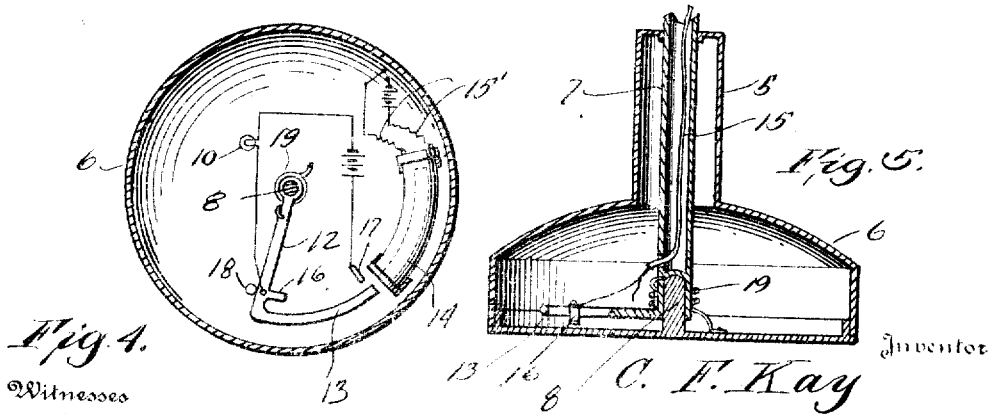
Figure 5:
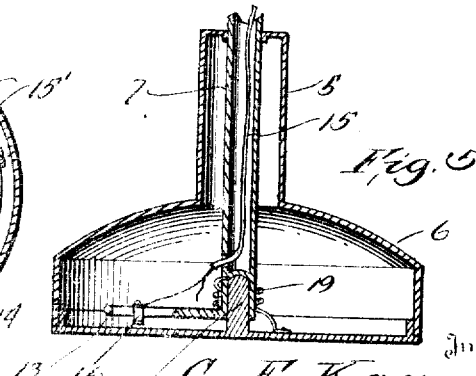

Figure 1 is a conventional showing of the rear end of a motor vehicle, equipped with my improved signaling device, Fig. 2 is a front elevation of one of the signal devices, Fig. 3 is a side view thereof, Fig. 4 is a section on line 4—4 of Fig. 2, and Fig. 5 is a section on line 5—5 of Fig. 2.

Referring more particularly to the drawings, 1 represents the body of a motor vehicle having the usual fenders 2 overlying the rear wheels. Preferably, but not necessarily mounted upon the fenders 2, are the signaling devices 3, which are electrically connected to suitable control devices, as switch buttons upon the steering wheel or the dash-board adjacent the driver's seat, whereby either or both of the devices 3 may be operated.

Each of the devices 3 consists of a dish-like circular casing 4, rotatably carried by the tubular standard 5. The standard 5 terminates at its lower end in a hollow base or casing 6, which contains the mechanism for rotating the device. Extending downwardly through the tubular standard 5 from the side of the casing 4, is a rod 7, whose lower end is axially recessed to seat upon the step bearing or pin 8, so that the casing 4 is supported for free rotation upon the standard 5 and upon the pin 8. Within the casing 4, is supported a lamp socket 9, which is arranged in axial alinement with the standard 5 and the rod 7, said socket 9 carrying the lamp 10 which is centered within the reflector casing 4. Said lamp is preferably dyed a suitable color, as red, to convey a suitable warning, and the light is not only reflected rearwardly from the reflector casing 4, but is also visible through the back of the reflector casing through the central opening 11. Preferably, the reflector casing 4 is also colored so that the signal will convey a warning when operated in daylight.

Extending to one side of the rod 7, at the lower end thereof, is an arm 12, whose outer extremity terminates in or carries an arcuate magnetic body 13, said body 13 lying concentric to the rod 7, and being operative as the movable core of an electromagnet 14 which is positioned within the base 6. Said electromagnet 14 is connected by wires 15′ into the electric circuit, which may be battery fed or otherwise, and is also wired to the buttons hereinbefore mentioned, but which need not be shown to properly disclose the present invention. The lamp 10 is connected as by the wires 15 into the electric system, so that when the proper button is pressed, the corresponding signal will be simultaneously rotated and illuminated.

Also mounted upon the arm 12 is a contact element 16 which is connected to one of the wires 15 leading from the lamp. Said contact 16 is adapted to be carried into contact with the contact 17 mounted upon the bottom of the base 6, when the core 13 is drawn into the electric magnet 14, said contact 17 being connected to the current source. A stop 18 located behind the arm 12 limits the movement of the latter so that the casing 4 will be stopped in proper position when the core 13 is released from the influence of the magnet 14, a coil spring 19 surrounding the rod 7 being properly arranged to swing the rod 7 to return the latter to normal position after deënergization of the electromagnet 14.

As shown in Fig. 1, the signal devices are two in number, one upon each of the fenders or rear corners of the vehicle body, so as to be visible both to the rear and to the front of the vehicle. In normal position, the signal devices stand parallel to the vehicle, that is as indicated in Figs. 1 and 3. When it is desired to indicate to parties in the rear of the vehicle that the driver is about to turn in one direction or the other, a proper button is pressed and the corresponding indicator or signal device will be turned from the position of Fig. 1 to the position of Fig. 2, that is, with the open face of the casing 4 turned to the front or rear. When the button is pressed, the circuit is closed through the electric magnet 14, which when energized draws therein the core 13, so that the device is rotated. When the core 13 with the arm 12 has swung through the arc necessary to bring the contacts 16 and 17 together, the circuit including the lamp 10 is closed, so that the latter is lighted. As soon as the button is restored to normal position, the lamp circuit and the electromagnetic circuit are broken, so that the spring 19 may restore the casing 4 to normal position. Obviously by operating both of the buttons, both of the casings will be thrown into signaling position which will indicate that the operator is either preparing to back the machine or to stop.

From the foregoing, it will be evident that I have devised a very simple electrically controlled signaling apparatus which is highly practical and can be manufactured at a comparatively low cost. The apparatus can be installed on any machine now in use, since each signaling device is practically self-contained, and does not require the modification of the machine to any extent.

What I claim as my invention is:—

1. A traffic indicator, comprising in combination, a hollow base supporting a bearing pin, a rotatable standard mounted upon said base and upon said pin, a reflector casing carried by said standard, and having said standard projected therein, an illuminating element on the upper end of said standard, an electro-magnet mounted within said base, a movable core for said magnet carried by said rotatable standard, means for connecting said illuminating element into an electric circuit, said circuit being closed and said casing being rotated when said electro-magnet is energized to attract said core and means for restoring the casing to normal position.

2. A signaling device for automobiles and the like, comprising a hollow relatively flat base with a convex upper portion having a central opening with a surrounding upstanding tubular standard, a hollow rod turnably mounted in the standard and extending to a point adjacent the bottom of the base and above the top of the standard, a dish-like reflector supported on edge by the rod, an electric lamp supported by the upper end of the rod within the reflector and projecting slightly therefrom so as to be visible edgewise of the reflector, a bearing upon the bottom of the base for supporting the rod in conjunction with the top of the standard, said electric lamp being normally in an open circuit, means for rotating the rod to retain the circuit normally open and means to turn the rod in the opposite direction to close the circuit to ignite the lamp.

3. A signaling device for automobiles and the like comprising a hollow relatively flat base with a convex upper portion having a central opening with a surrounding upstanding tubular standard, a hollow rod turnably mounted in the standard and extending to a point adjacent the bottom of the base and above the top of the standard, a dish-like reflector supported on edge by the rod, said reflector having a central opening, an incandescent lamp receiving socket supported upon the upper end of the rod and extending radially within the reflector whereby an incandescent lamp mounted therein will be partly visible at the center thereof and through said central opening in the reflector from the side opposite to the reflector surface thereof, the lower end of the rod having a socket formed therein, a pin carried by the bottom of the base and engaging the socket to rotatably support the reflector, an arm fixed to the rod at its lower end and having a contact projecting therefrom and an arcuate portion, means to limit the movement of the arm in one direction and consequently the rod and reflector, means for normally disposing the arm in the last named position, a stationary contact for engagement by the movable contact of the arm, an electro-magnet arranged in the base and adapted upon energization to attract the arcuate portion as a core for turning the rod and reflector whereby to bring the movable contact into engagement with the stationary contact, said lamp being connected in circuit with the contacts to be ignited upon engagement thereof and to be extinguished upon the deënergization of the magnet and separation of the contacts.

In testimony whereof, I affix my signature, in the presence of two witnesses.

CHARLES F. KAY.

Witnesses:
F. J. McCORMOCK,
ALEX. ALLARDYCE.